Patented Nov. 20, 1928.

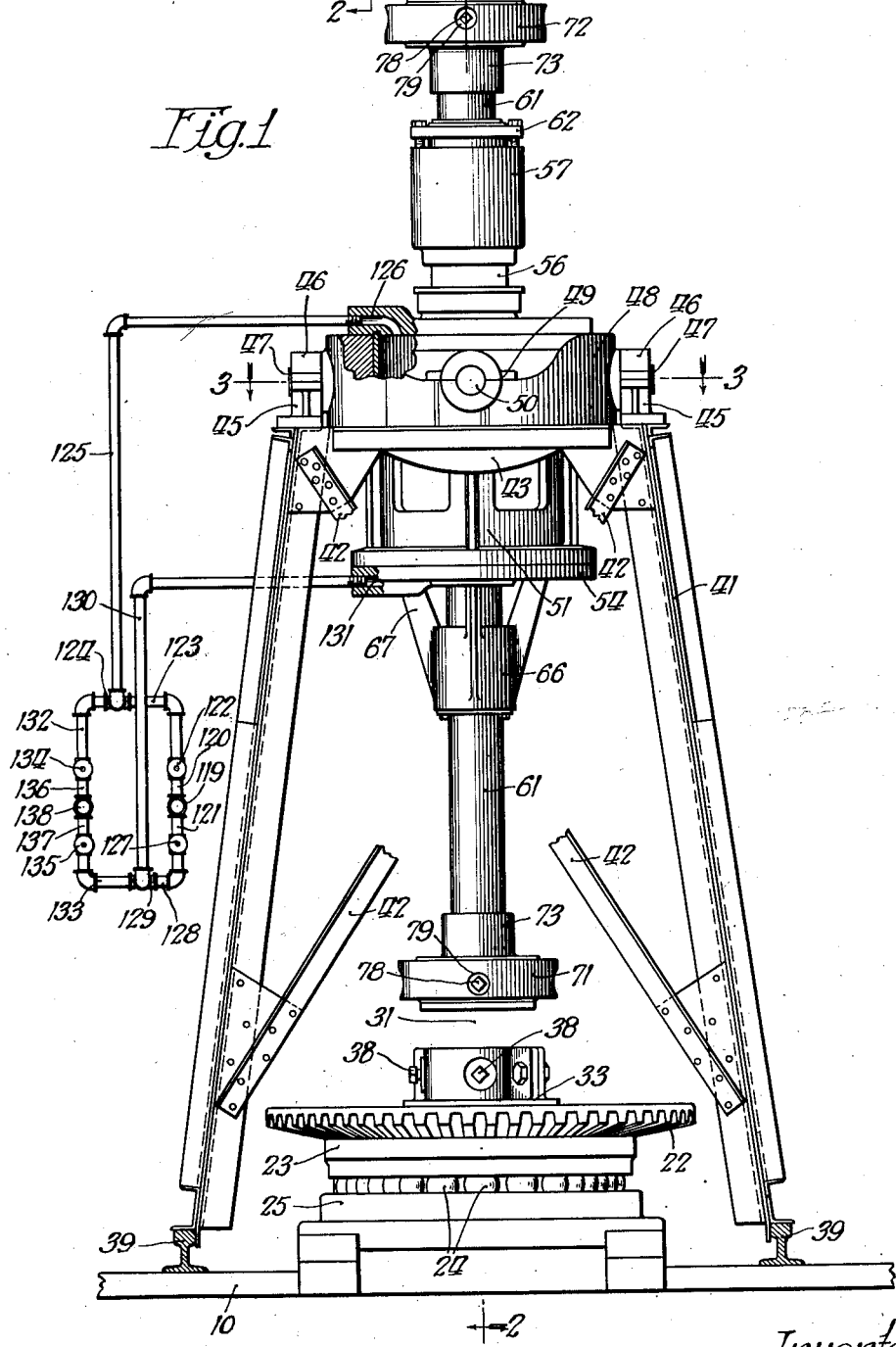

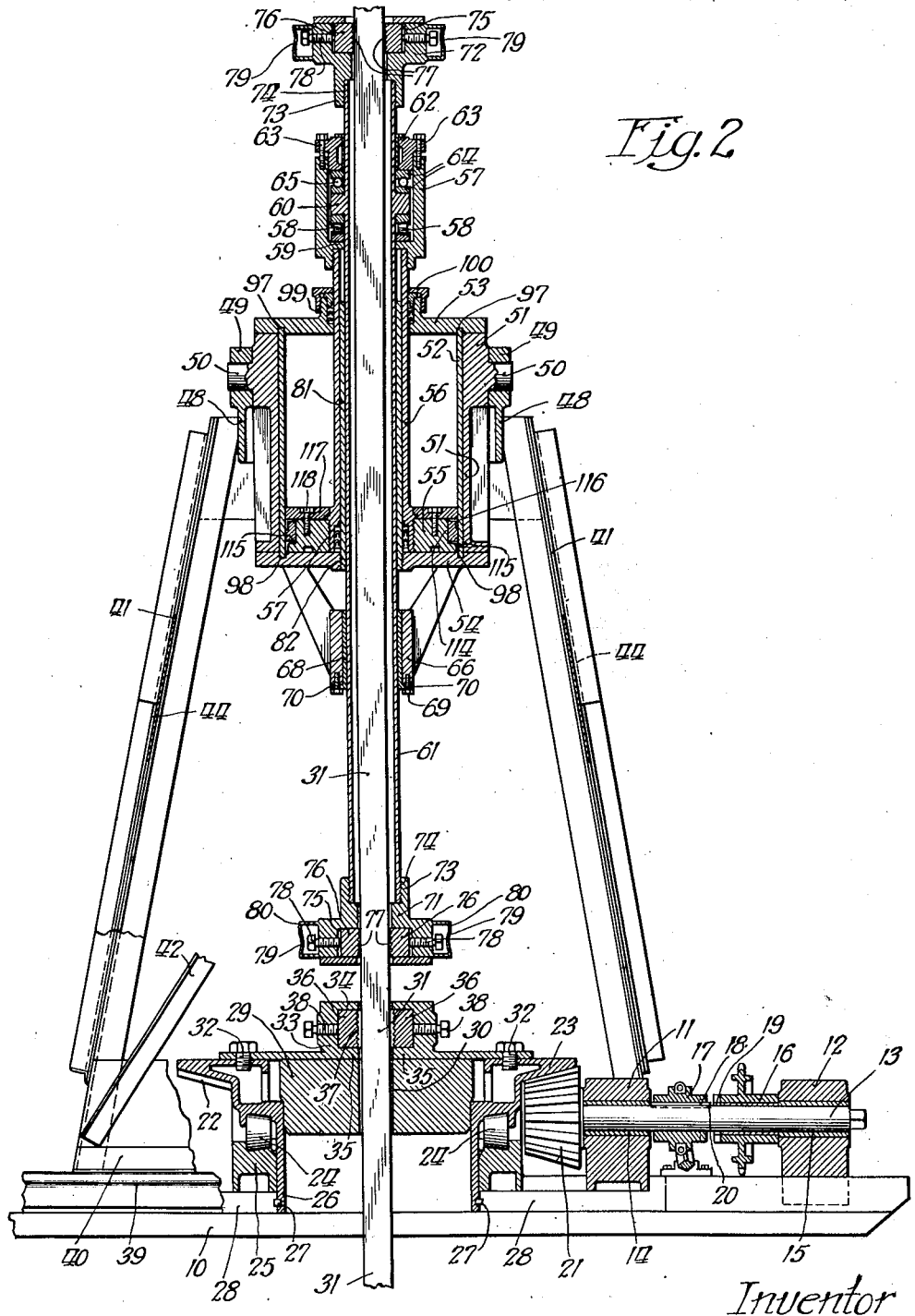

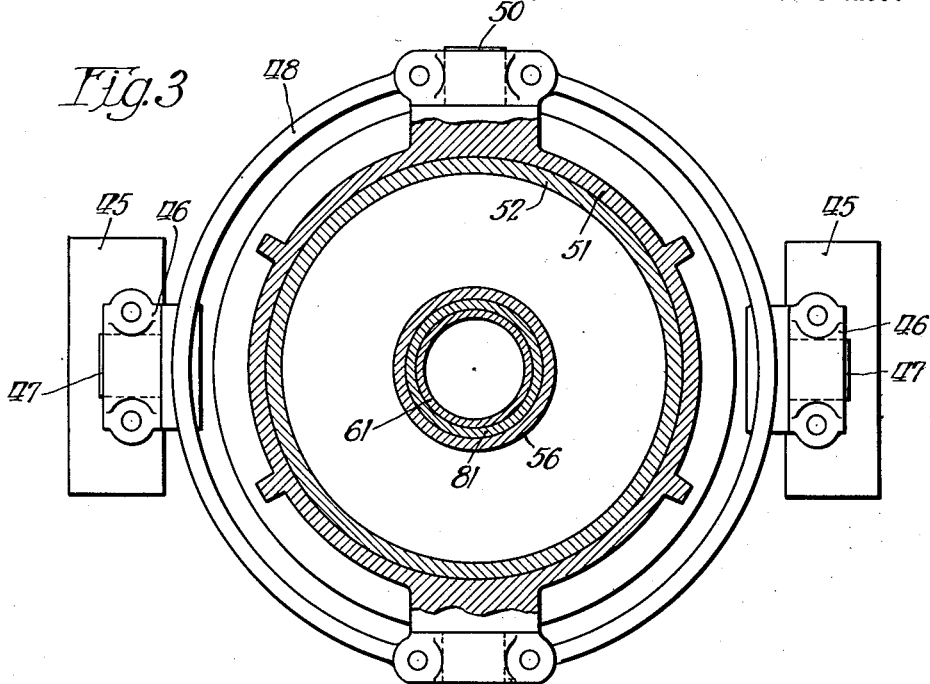
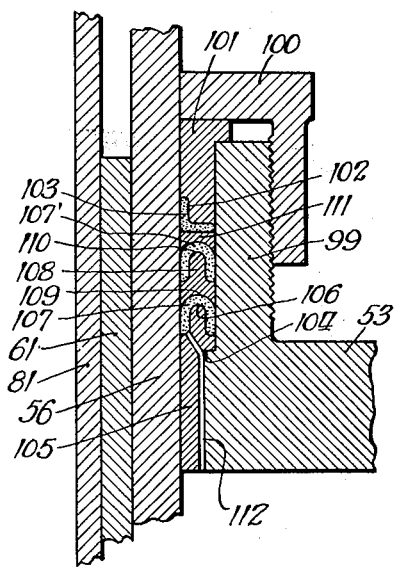
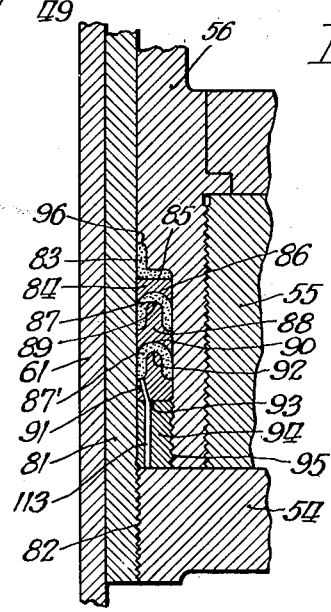

1,692,431

UNITED STATES PATENT OFFICE.

OLOF B. ANDERSON, OF MARQUETTE, MICHIGAN, ASSIGNOR TO E. J. LONGYEAR MANUFACTURING COMPANY, A CORPORATION OF DELAWARE.

HYDRAULIC-FEED ROTARY DRILL.

Application filed June 7, 1924. Serial No. 718,568.

My invention relates to drills and more particularly to an improved feeding mechanism for rotary drills. It is a purpose of my invention to provide a rotary drill such as that used for drilling oil wells with feeding mechanism that is of sufficient flexibility to permit considerable variation in the rate of feed of the drill in accordance with the requirements of the work performed thereby. In drilling wells or for similar purposes, it is well known that the feeding of the drill can be accomplished at different speeds as the same goes through strata of different material in the earth as the bore is being made. While rotary drills have been satisfactory when drilling through gumbo or similar soft material, often hard layers of limestone or shale are encountered in drilling the holes which retard the progress of the drill to a great extent. Drilling through these hard layers is only satisfactorily accomplished by a carbon set in the soft steel cylindrical bit which cuts out a cylindrical core. However, these drills cannot be used with the common method of feeding rotary drills because the control of the feed is not dependable enough and there is too much danger of damaging these drill bits.

It has been found that the difficulty in feeding a rotary drill of this character can be overcome by providing a hydraulic feed for the drill. In order to provide a hydraulic feed for a drill of this character, the usual rotary table for rotating the drill is provided with a rotating bar or grief stem, said grief stem or rotating bar being axially slidable relative to the rotary table and the feeding of said stem downwardly being accomplished by suitable hydraulic means causing the same to pass through the rotating table in a downward direction. It is a further purpose of the invention to provide suitable means for feeding the rotary bar or grief stem into the hole which comprises a hydraulic cylinder within which a suitable piston is mounted which carries a member thereon having gripping means for said stem, said hydraulic cylinder being provided with suitable mechanism for moving the piston upwardly or downwardly as desired.

It is a further purpose of the invention to provide a suitable mounting for the hydraulic cylinder which is preferably in the nature of a universal mounting to allow for any movements of the rotary bar or grief stem out of its normal axis of rotation.

It is still a further purpose of the invention to provide suitable means, mounted on the rotary table for rotating the stem or rotating bar, for gripping said stem or bar when desired to prevent the pressure in the hole from forcing the bar upwardly. This arrangement is desirable because in the drilling operation with this apparatus, the grief stem or rotating bar is first fed downwardly by the piston in the hydraulic cylinder, the speed of feeding being controlled by the operator of the device and after the piston has reached the end of its travel in a desired direction, the gripping means on the turn table is adjusted to grip said grief stem, the same being normally free of said gripping means and slidable therethru, and the gripping means on the rod or bar secured to the piston is released after which the piston is caused to travel upwardly by proper adjustment of the valves leading to the cylinder. After said piston has reached the end of its upward travel, the gripping means associated with said piston is adjusted to take a new hold on the grief stem whereupon the gripping means on the rotating table is again released to allow the grief stem to pass therethru, and the feeding operation is again begun in the same manner as before.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a view in side elevation partly broken away of my improved drilling apparatus;

Fig. 2 is a similar view in vertical section, portions of the framework being shown in elevation;

Fig. 3 is a section taken on the line 3—3 of Fig. 1;

Fig. 4 is an enlarged detail vertical section of a portion of the upper end of the cylinder and the piston rod passing therethru; and Fig. 5 is a similar view of a portion of the piston and the piston rod and the piston end of the cylinder.

Referring in detail to the drawings, my improved drilling device comprises a base member 10 upon which is mounted the bearing members 11 and 12 in which the shaft 13 is adapted to rotate, said bearing members being provided with suitable bushings 14 and 15 respectively. Freely rotatably mounted on the shaft 13 is a power driven member 16 which is shown in the drawings as being a sprocket wheel driven by a sprocket chain by any suitable source of power. Keyed on said shaft 13 is a clutch member 17 which may be operated by any suitable operating means to move the same lengthwise on the key 18 toward and away from the sprocket wheel 16, the hub of the sprocket wheel 16 being provided with suitable recesses 19 for receiving the projections 20 on the clutch member 17. It will thus be seen that the shaft 13 can be caused to rotate with the sprocket wheel 16 by actuation of the clutch member 17. The shaft 13 is provided with a bevelled gear 21 which is adapted to mesh with the teeth 22 on the rotary table or enlarged ring gear 23. The table 23 is suitably mounted on rollers or roller bearings 24 which are mounted in a suitable bearing ring 25 provided on the base 10. The rotary table member 23 is provided with a depending flange portion 26 and the keys 27 are provided that engage with a groove in the flange 26 and with grooves in the ribs 28 provided on the base 10. The details of the rotary table construction and driving means therefor may be varied, as desired, as various mountings and driving means therefor are known in the art.

Within the rotary table member 23 is mounted a bushing 29, which is provided with a polygonal opening 30 preferably square for receiving the rotating bar or grief stem 31 which is also non-circular in form and preferably square. Secured to the rotary table 23 by means of suitable screws 32 is the gripping member 33 which is provided with a pair of flanges 34 and 35 between which are mounted the jaws 36 which are provided with suitable teeth 37 for gripping the grief stem 31, said teeth being moved into engagement with said stem 31 by means of the clamping screws 38.

Mounted on the base 10 are the rails 39 upon which are mounted the longitudinally extending members 40 of the framework comprising the upwardly converging frame members 41 which are braced by means of suitable diagonal extending braces 42 and which are secured together at the top thereof by means of the plates 43, plates 44 being further provided intermediate the length of the members 41 to connect the same together to thus provide a more rigid framework. Mounted on said framework is a pair of bearing boxes 45 having bearing portions 46 for receiving the stub shafts or trunnions 47 provided on the ring member 48. Said ring member 48 is provided with a pair of bearing members 49 in which are journalled the trunnions or stub shafts 50 on the jacket 51 of a cylinder 52 having the cylinder heads 53 and 54 provided thereon and held in place by means of said jacket member 51 to which they are secured by suitable fastener devices.

It will be seen from the above, that the hydraulic cylinder 52 is substantially universally mounted on the frame work as the same can swing on the trunnions 50 in the bearings provided in the ring 48, and said ring 48 is further adapted to swing on a horizontal axis on the trunnions 47 mounted in the bearings 46. Within the cylinder 52 is mounted a piston 55 to which is secured in any suitable manner so as to move therewith, the piston rod 56 which is shown as being a hollow member. The piston rod 56 is shown in the drawings as being screw threadedly secured to the piston 55 by means of the screw threads indicated at 57 in the drawings. The piston rod 56 extends upwardly through the cylinder head 53 and has screw threadedly mounted on the upper end thereof a bearing member or cage 57. Mounted within the member 57 are the roller bearings 58, said roller bearings being mounted between the inwardly extending flange 59 on the member 57 and the thrust collar 60 provided on the hollow spindle 61. The member 57 is further provided with a thrust bearing 62 for the hollow spindle 61, said thrust bearing being secured to the member 57 by means of the screws 63 and being provided with the rings 64 between which the bearing balls 65 are mounted. The hollow spindle 61 further extends through a bearing 66 provided on the downwardly extending bracket 67 which is provided on the cylinder head 54. Removably mounted within the bearing member 66 is a removable bushing 68 secured thereto by means of the screws 69 extending through the flanges 70.

The grief stem or rotating rod 31 extends through the hollow spindle 61 and said spindle 61 is provided with a lower chuck 71 and an upper chuck 72 which are provided with suitable gripping bars engaging the grief stem or rotating bar. The members 71 and 72 are each provided with internally screw threaded portions 73 engaging with the screw threaded ends 74 of the hollow spindle 61. Mounted within suitable openings 75 in said members 71 and 72 are the gripping jaws 76 which are provided with suitable teeth 77 adapted to engage the grief stem 31. The jaws 76 are tightened into gripping engagement with the member 31 by means of the said screws 78, the heads of said screws being accessible through the openings 79 and mounting 80 provided on the members 71 and 72.

Referring now to Fig. 2, it will be noted that the hollow rod or tubular member 81 is provided between the member 56 and the member 61, said member 81 being secured to the cylinder head 54 by being screw threaded therein as indicated at 82. The construction of the parts is more clearly shown in Fig. 5. Mounted between the tubular member 81 and the member 56 is the L-shaped or angular leather gasket 83, the ring 84 having a flat face 85 adjacent the gasket 83 and having a curved face 86 against which the U-shaped leather gasket 87 fits. Two of said U-shaped leather gaskets are used, the second of said gaskets being indicated by the numeral 87'. Between the gaskets 87 and 87' is a ring 88 having the convex face 89 and concave face 90 adjacent the gaskets 87 and 87' respectively. A ring 91 having a curved face 92 adjacent the gasket 87' is also provided, said ring 92 having a flat face 93 adjacent the clamping nut 94 screw threadedly engaging the internal screw threads 95 on the member 56. The member 94 is provided for holding the various rings and gaskets in proper position and for adjusting the same so as to provide a liquid tight fit between the members 56 and 81. The packing 83 is seated in a recess 96 in the member 56 as will be clear from Fig. 5. In this manner a fluid tight joint is provided between the piston 55 and the tubular member 81. The cylinder member 52, it will be noted, is recessed in the heads 53 and 54 as indicated by the numerals 97 and 98 respectively to provide a tight joint between the members 52 and 54.

The cylinder head 53 is provided with a boss or a screw threaded projection 99 with which the nut 100 screw threadedly engages. The gland 101 is mounted between the nut 100 and the tubular member 56. The gland is recessed at 102 to receive an L-shaped or angular leather gasket 103, which is mounted between said gland 101, the tubular member 56 and the screw threaded nipple or boss 99. The cylinder head 53 is provided with a shoulder 104 inwardly of the screw threaded member 99 and a flanged ring 105 is mounted between the members 56 and 53 and engages said shoulder 104. The ring 105 is provided with a curved seat 106 for receiving the U-shaped leather gasket 107 and a ring 108 having a concave seat 109 adjacent the gasket 107, and a convex seat 110 adjacent the gasket 107' which is similar to the gasket 107, is provided for properly positioning said gaskets. A ring 111 which has a curved face adjacent the gasket 107' and a flat face adjacent the gasket 103 is also provided for properly holding said gaskets in position. It will accordingly be seen that when the nut 100 is tightened up, the gland 101 will compress the gaskets 103, 107' and 107 against the members 56 and 99 to provide a tight joint therebetween, thus providing a fluid tight joint between the cylinder head 53 and the member 56. A suitable oil groove 112 may be provided for oiling the sliding parts in said joint and a similar oil groove 113 may be provided in the members 94 and 91 for the same purpose.

In order to prevent leakage of fluid past the piston 55, a groove 114 is provided therein, in which the flanged leather gaskets 115 and 116 are mounted, said gaskets being clamped in position by means of the clamping ring 117 secured in position on the piston 55 by means of the set screws 118.

Fluid pressure is supplied to the opposite sides of the piston through suitable passages in the cylinder heads 53 and 54 from a suitable source of fluid pressure, said source of fluid pressure supplying water or other suitable fluid under pressure through the inlet pipe 119 from which the pipes 120 and 121 extend in opposite directions, each of said pipes being provided with valves, the valve 122 leading from the pipe 120 to the T 124 through the pipe 123 from which a pipe 125 leads to the passage 126 in the cylinder head 53 and the valve 127 leading from the pipe 121 to a pipe 128 connected with a T 129 which has the pipe 130 connected therewith leading to the passage 131 in the cylinder head 54. The T's 124 and 129 are respectively provided with suitable pipes 132 and 133 which lead to the valves 134 and 135 respectively, said valves being connected by means of the pipes 136 and 137 with an outlet pipe 138.

It will be seen that with the above arrangement of valves when the valve 122 is open and the valve 127 is closed and the valve 135 is open and the valve 134 is closed, the fluid from the inlet pipe 119 will flow through the valve 122 and through the pipe 125 into the passage 126 and into the cylinder head 53, thus driving the piston 55 downwardly, the fluid ahead of the piston 55 flowing out through the passage 131 and the pipe 130 through the valve 135 to the outlet pipe 138. When the piston 55 has reached the end of its downward movement, the valve 122 is closed and the valve 127 opened, whereas the valve 134 is opened and the valve 135 is closed, thus the fluid under pressure from the inlet pipe 119 will flow through the valve 121 and through the pipe 130 into the cylinder head 54 moving the piston 55 upwardly, the fluid above the piston 55 passing out through the passage 126 and the pipe 125, then through the valve 134 to the outlet pipe 138. Obviously the amount of pressure exerted on the drill can be varied in accordance with the amount that the valve 122 or 127 is opened. In carrying out the drilling operation, assuming that the piston 55 is in its upward position, the gripping jaws 76 will be in engagement with the member 31 and the valve 122 is then operated to obtain the desired feeding of the member 31 downwardly, the piston 55 travelling downwardly under the control of said valve. When the piston 55 has reached the position shown in Fig. 2, the valve 122 is closed, the gripping members 36 are engaged with the member 31 and then the members 76 are released from the member 31 whereupon the valve 127 is opened, it being of course, understood that the valve 135 is closed and the valve 134 open at this time and the piston 55 is caused to travel upwardly by the fluid pouring into the cylinder head 54. When the piston 55 has reached the upper end of its movement, the jaws 76 are again tightened on the stem 31 and the jaws 36 are released. Then a second feeding operation is begun in the same manner as previously.

Having thus described my invention, what I desire to claim and secure by U. S. Letters Patent is:

1. A device of the character described comprising a stem, a rotatable table for rotating said stem, said stem being slidable therethrough, and means for advancing said stem during rotation thereof comprising a cylinder, a piston in said cylinder, a member moving with said piston having means for gripping said stem and means for supplying fluid under pressure to said cylinder to move said piston therein said cylinder being swingably mounted so as to automatically align itself with said stem.

2. A device of the character described comprising a stem, means for rotating said stem comprising a rotatable table, said stem being slidable therethrough, and means for advancing said stem during rotation thereof comprising a substantially universally mounted cylinder, a piston in said cylinder, a member moving with said piston having means for gripping said stem and means for supplying fluid under pressure to said cylinder to move said piston therein.

3. A device of the character described comprising a stem, means for rotating said stem comprising a rotating table, said stem being slidable through said table, means on said table adapted to grip said stem and hold it from sliding through said table, and means for advancing said stem during rotation thereof comprising a cylinder, a piston in said cylinder, a member moving with said piston having means for gripping said stem and means for supplying fluid under pressure to said cylinder to move said piston therein.

4. A device of the character described comprising a base, a framework on said base, a cylinder mounted on said framework, a tubular guide in said cylinder, a piston in said cylinder, means for supplying fluid under pressure to said cylinder to move said piston, a piston rod fixed on said piston engaging said guide, a hollow spindle rotatably mounted on said piston rod and having gripping jaws thereon, said guide lying between said spindle and piston rod and guiding both of them, a rotatable stem engaged by said gripping jaws, and means on said base for rotating said stem.

5. A device of the character described comprising a base, a framework on said base, a cylinder substantially universally mounted on said framework, a piston in said cylinder, means for supplying fluid under pressure to said cylinder to move said piston, a member moving with said piston having gripping jaws thereon, a rotatable stem engaged by said gripping jaws, and a rotatable table secured on said base in axially spaced relation to said cylinder for rotating said stem, said stem being slidable through said table.

6. A device of the character described comprising a base, a framework on said base, a cylinder substantially universally mounted on said framework, a piston in said cylinder, means for supplying fluid under pressure to said cylinder to move said piston, a piston rod fixed on said piston, a member moving with said piston rod and rotatable therein having gripping jaws thereon, a rotatable stem engaged by said gripping jaws, and means on said base axially spaced from said cylinder for rotating said stem.

7. A device of the character described comprising a rotatable stem, means for rotating said stem, and means for advancing said stem during rotation thereof comprising a cylinder, a piston in said cylinder, a hollow piston rod fixed on said piston, a hollow spindle rotatably mounted in said piston rod to move axially therewith, said stem extending into said spindle, gripping means on said spindle engaging said stem, a hollow sleevelike member secured to one of the heads of said cylinder and extending between said piston rod and said spindle, and means for supplying fluid pressure to said cylinder to move said piston therein.

8. A device of the character described comprising a rotatable stem, means for rotating said stem, and means for advancing said stem during rotation thereof comprising a cylinder, a piston in said cylinder, a hollow piston rod fixed on said piston, a hollow spindle rotatably mounted in said piston rod to move axially therewith, said stem extending into said spindle, gripping means on said spindle engaging said stem, a hollow sleevelike member secured to one of the heads of said cylinder and extending between said piston rod and said spindle, means providing a fluid tight joint between said sleevelike member and said piston rod and means for supplying fluid pressure to said cylinder to move said piston therein.

9. A device of the character described comprising a rotatable stem, means for rotating said stem, and means for advancing said stem during rotation thereof comprising a cylinder, a piston in said cylinder, a hollow piston rod fixed on said piston, a hollow spindle rotatably mounted in said piston rod to move axially therewith, said stem extending into said spindle, gripping means on said spindle engaging said stem, a hollow sleevelike member secured to one of the heads of said cylinder and extending between said piston rod and said spindle, means providing a fluid tight joint between said sleevelike member and said piston rod, means providing a fluid tight joint between said piston rod and the other head of said cylinder, and means for supplying fluid pressure to said cylinder to move said piston therein.

10. A device of the character described comprising a base, a framework on said base, a member mounted to pivot on a substantially horizontal axis on said framework, a cylinder mounted on said member to pivot on an axis substantially at right angles to said first axis, a piston in said cylinder, a drill stem, means on said base for rotating said stem having an opening therein through which said drill stem passes, means moving with said piston engaging said stem whereby said stem and said means move axially in unison, and fluid pressure means for moving said piston to feed said stem downwardly.

11. A device of the character described comprising a base, a framework on said base, a member mounted to pivot on a substantially horizontal axis on said framework, a cylinder mounted on said member to pivot on an axis, substantially at right angles to said first axis, a piston in said cylinder, a drill stem, means on said base for rotating said stem having an opening through which said drill stem passes, means moving with said piston engaging said stem whereby said stem and said means move axially in unison, said means comprising a member fixed on said piston, and a hollow spindle journalled therein on one side of said cylinder and journaled in a bearing member extending from the other side of said cylinder, said spindle loosely receiving said stem, the opposite ends of said spindle beyond said bearings carrying gripping means engaging said stem, and fluid pressure means for moving said piston to feed said stem downwardly.

In witness whereof, I hereunto subscribe my name this 14th day of May A. D., 1924.

OLOF B. ANDERSON.